April 5, 1960   J. H. CATHER   2,931,336
BIRD FEEDER
Filed Jan. 10, 1958

INVENTOR,
JAY HOWARD CATHER
BY
Cumpston & Shaw
his attorneys.

United States Patent Office 2,931,336
Patented Apr. 5, 1960

2,931,336

BIRD FEEDER

Jay Howard Cather, Rochester, N.Y.

Application January 10, 1958, Serial No. 708,321

7 Claims. (Cl. 119—52)

This invention relates to bird feeders and, more particularly, to housings for containing and supplying the seeds preferred by certain varieties of wild birds. A bird feeder is commonly used with the desire that it may be frequented primarily by birds of one or more favorite varieties, such as cardinals, chickadees and the like, rather than by birds of a more commonplace and less attractive nature, or by birds of a size capable of quickly exhausting the supply of feed provided, to the deprivation of the more favorite species. One object, therefore, is to provide a feeder constructed and arranged for adapting and restricting its use to birds of selected varieties, including means for varying such adaptation and means for remotely and conveniently controlling the same.

It is desirable also that the feeder be effectively protected against the weather, while avoiding such excessive restriction of light or access as to frighten and discourage timid visitors. Another object, therefore, is to supply a feeder having a well lighted construction with easy access to the seeds by selected varieties of birds.

Another object is the provision of a feeder having a readily visible feed hopper and convenient means for access thereto to replenish the supply of seeds.

Another object is to supply a feeder having hopper means insuring a continuous flow of seeds through a feed passage, so as to avoid the alarming or trapping of birds in the hopper by intermittent cascading of seeds tending to obstruct the feed passage.

Another object is to provide a feeder adapted to be conveniently supported on means having effective protection against raiding by climbing animals. Still another object is to supply a feeder having the above advantages in a construction adapted to be readily and economically manufactured, assembled and installed for use.

To these and other ends the invention resides in certain improvements and combinations of parts, all as will be hereinafter more fully described, the novel features being pointed out in the claims at the end of the specification.

Figure 1:
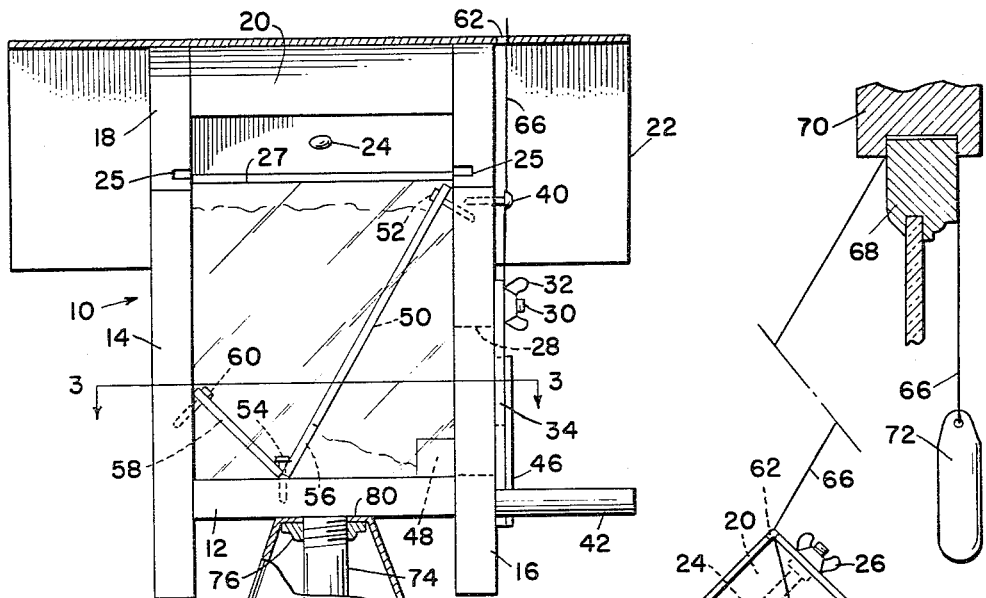
Fig. 1 is a side elevation, partly in section and partly broken away, of a feeder embodying the present invention.
Figure 2:
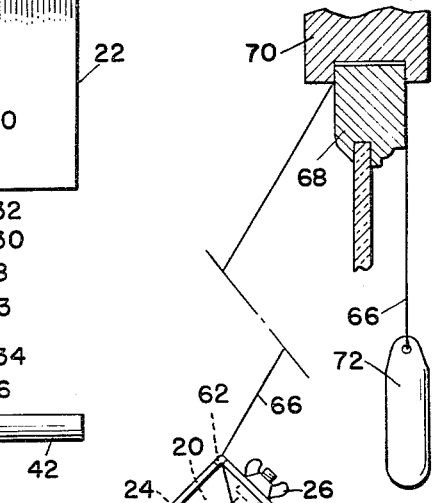
Fig. 2 is a front elevation of the same as arranged for use by birds of smaller size, with a schematic illustration of remote control means.
Figure 3:
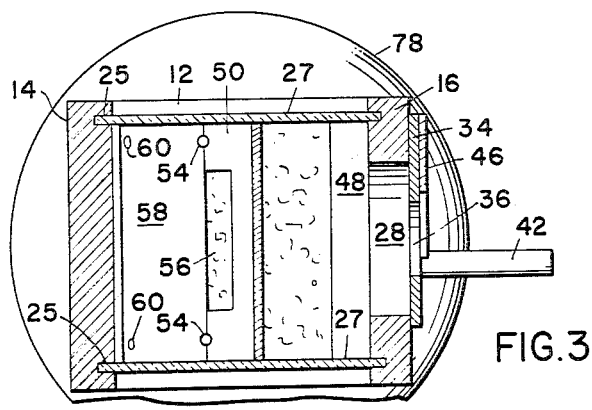
Fig. 3 is a sectional, plan view on the line 3—3 in Fig. 1.

The preferred embodiment of the invention, herein disclosed by way of illustration, comprises a housing indicated generally at 10, having a bottom or floor 12, rear wall 14 and front wall 16. The bottom wall 12 is enclosed between the front and rear walls and may have a size, for example, of 5¾ x 5 inches, being preferably spaced somewhat above the bottom of the front and rear walls, as shown. The front and rear walls each have their upper ends 18 inclined upwardly and inwardly to include angles having sides making an angle of about 90° with each other as shown in Fig. 2. These parts are conveniently made of wood boards about ¾ of an inch thick. A rectangular wooden bar 20 connects and supports the upper ends of the walls in spaced relation.

The roof 22 is preferably formed by a single sheet of metal or other suitable material, bent upon itself to fit the angle of the upper ends of the walls, with a substantial overhang on all sides to afford ample protection against the weather. A bolt 24 is passed through the bar 20 and extends through an opening in the roof, with a wing nut 26 for removably securing the roof on the housing.

The side walls of the housing are formed by clear glass plates as 27, slidably secured in vertical kerfs 25 grooved into the front and rear walls, as shown, thus admitting light to the whole interior of the housing and capable of being easily removed for cleaning.

Front wall 16 has cut therein a circular feed opening 28 of about 3 inches in diameter with its lower edge level with floor 12 for admitting desired birds of larger size such as cardinals. A bolt 30 projecting forwardly through the front wall and provided with a wing nut 32 serves to pivotally support a thin plate or board 34 of tempered "Masonite" or the like formed with a smaller opening 36, 1¾₆ in diameter, for the admission of desired birds of smaller size, such as chickadees, nut hatches and the like. By loosening nut 32, plate 34 is allowed to drop to its lowermost position shown in full lines in Fig. 2 where it rests upon a perch bar 42 hereafter referred to. However, plate 34 may be swung upwardly, to the position shown in dotted lines at 38 against a pin 40 in the housing, where it may be secured by tightening the nut 32 or by the remote control means hereafter referred to.

The perch rod 42 extending forwardly from the front wall below opening 28 is positioned to limit the downward movement of plate 34 so as to leave open a small portion 44 of the feed opening, as shown, for a purpose hereafter described. Plate 34 is provided at its bottom with a thin and inconspicuous plate 46 of metal, as lead, to weight plate 34 and cause it, when released, to drop of its own weight to the full line position where it obstructs the larger opening 28 and substitutes instead the smaller opening 36.

A rectangular bar 48, having a horizontal width of ¾ of an inch, is secured in the corner between the floor and front wall, below or across the bottom of the feed openings therein for the purpose of retaining a supply of seeds, such as sunflower seeds, at a distance back of the center of the feed opening 36 beyond the reach of the larger birds referred to which is not more than about 2¼ inches, to restrict access to the seeds by such birds on perch 42 as hereafter described.

The feed hopper in the housing is preferably formed by a partition 50 of thin board such as "Masonite" or the like, extending across from one side wall to the other, in the downwardly and rearwardly inclined position shown where it is secured, as by nails 52 and 54, at its top and bottom. This partition is inclined at an angle of about 30° with the vertical and its lower edge at floor 12 is cut out as at 56 to a height of about 1⅛ inches to form a feed gate for feeding the seeds forwardly over the floor toward bar 48. A smaller partition 58 of "Masonite" extends from one side wall to the other and downwardly and forwardly at an angle of about 45° from the rear wall, into proximity with the bottom of partition 50. The seeds are thus supported in the hopper by two inclined partitions 50 and 58 by means of which they are continuously fed by gravity to and through feed gate 56 as withdrawn from the floor by the birds, thereby avoiding intermittent cascading of the seeds over the feed gate, as might otherwise occur. This avoids alarming or even trapping smaller birds which may at times crowd through the feed gate. Partition 58 is secured as described by means of the nails 54 and nails 60 driven into the rear wall.

Means are provided for remote control of the position of plate 34 and the feed openings presented thereby, comprising an opening 62 in the ridge of roof 22 outside the housing. The feed opening plate 34 is formed with a perforation 64 and a length of flexible cord 66, such as the "nylon" cord, for example, employed in fishing lines, is threaded through opening 62 and secured in opening 64, the other end of the cord being carried upwardly to a suitable remote point, as over a window sash 68 in a dwelling, as indicated schematically in Fig. 2. For such remote control the feeder should be stationed not more than about 35 feet from the dwelling from which it is to be observed. The sash of a window, preferably on an upper floor, is lowered in its frame 70, cord 66 is passed over the sash with its longer end depending inside the window and attached to a weight 72 of about the same weight as the feed opening plate 34. With plate 34 released by unscrewing nut 32, a slight lowering of the window sash is sufficient to allow sliding of the cord, and raising or lowering of the feed opening plate, by lowering or raising weight 72, after which the raising of the sash serves to bind the cord and secure the feed opening plate in adjusted position.

The housing is preferably supported on a post or pipe 74 which may be a half-inch steel pipe threaded at its upper end and carrying a flange or waste nut 76. Such a pipe is readily sunk vertically into the ground to a depth of about 2 feet to afford the desired stability. To protect the housing against climbing animals, such as squirrels, a sheet metal cone 78 having its sides inclined at about 20° to the vertical, as shown, is inverted and secured between the pipe and housing. A funnel 78 having a larger end of, say, 9 inches in diameter, has been found suitable, the lower edge being left smooth to avoid any foothold for such animals. The opening in the smaller end of the funnel is enlarged as required and has its edges flanged inwardly as at 80 over waste nut 76 which is securely fastened to the floor of the housing by the usual screws, thus securing the housing on the pipe and fixing the funnel in position, as shown.

With the housing mounted as described, the condition of the hopper is readily observed through the glass side walls of the housing and as replenishment of the seeds is required, the roof 22 is conveniently removed to afford full access from above for filling the hopper, the seeds flowing downwardly through the feed gate 56 and over the floor 12 to the rear side of bar 48 at a distance inwardly from the feed opening. Plate 34 is positioned to present either the larger or smaller feed opening and secured by nut 32 or by cord 66. When it is desired to feed only birds of the smaller size referred to, the plate is placed in its lower position and only such birds can enter the smaller opening sufficiently to reach the seeds behind bar 48. It has been found that with this opening of the size indicated above, birds such as chickadees and nut hatches or smaller birds may alight upon the perch 42 and reach the seeds through the feed opening, or actually enter the housing in front of the hopper, whereas English sparrows and larger birds cannot enter or reach into the feed opening far enough to obtain the seeds.

When plate 34 is located in its uppermost position, exposing the larger opening 28, birds of the size of cardinals and smaller birds may readily obtain the seeds. In the event the housing is observed to be frequented by undesirable varieties such, for example, as grackles, blue jays or other birds of similar or larger size, likely to drive away the desired birds or to rapidly deplete the supply of seeds, the cord 66 may be released by raising weight 72, thus dropping plate 34 to tap and warn such undesired visitors. The minimal opening 44 left from the larger opening 28 is sufficient to prevent injury to the head or neck of such a bird but it has been found by trial that when a grackle or blue jay is so warned, it transmits the warning to others of its kind who avoid the feeder for a matter of months. Even such tapping and warning of an English sparrow is communicated to others of the flock so that they avoid the feeder for a matter of weeks, leaving it to unobstructed use by birds of the desired varieties.

While the overhang of roof 22 serves to amply protect the housing parts from the weather, the interior of the housing is left readily visible through the glass side walls for ascertaining the necessity for replenishing the hopper. Such glass side walls have the additional advantage of fully illuminating the interior of the housing for inspection by the birds to insure confidence in entering the feed openings. The inclined bottom walls of the hopper keep the seeds flowing down to and through the feed passage 56, thus avoiding intermittent cascading of the seeds likely to alarm a bird or even to trap a smaller bird which may have entered the hopper through the feed passage.

While the housing may be otherwise supported, as by suspension from above, it is adapted as described to be supported on a post in any desired location and protected against squirrels or other climbing animals by the barrier cone 78.

The housing parts are made from known and available materials and readily shaped and assembled so that the feeder may be economically and readily manufactured, assembled and installed for use.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. In a bird feeder, a housing comprising a floor, roof and four side walls including opposite side walls and front and rear walls, a partition extending from said front wall between said side walls downwardly and rearwardly toward said floor to form thereabove a feed hopper with a portion of the lower edge of said partition spaced above said floor to form a feed gate spaced rearwardly from said front wall, a feed opening of variable size in said front wall, a barrier in the corner between said floor and front wall and across and inwardly of said feed opening to retain feed material at a predetermined fixed distance inwardly from said feed opening and means for selectively varying the size of said feed opening to afford access through said opening to said material beyond said barrier either by birds of predetermined larger size while perched on said housing outside said front wall, or alternatively by birds of predetermined smaller size only while perched on said housing outside said front wall.

2. In a bird feeder, the combination specified in claim 1 comprising a feed opening of larger size in said front wall and a plate pivotally mounted on said front wall to swing over said feed opening and provided with a feed opening of smaller size for registry alternatively with said larger feed opening to selectively vary the size of feed opening provided to afford access through said opening to said material beyond said barrier either by birds of predetermined larger size while perched on said housing outside said front wall or alternatively by birds of predetermined smaller size only while perched on said housing outside said front wall.

3. In a bird feeder, the combination specified in claim 2 in which said larger feed opening has a diameter of about 3 inches and said smaller feed opening has a diameter of 1 9/16 inches.

4. In a bird feeder, a housing comprising a floor, a roof and four side walls including opposite side walls and front and rear walls, a partition extending between said side walls downwardly and rearwardly toward said floor to form thereabove a feed hopper with a portion of the lower edge of said partition spaced above said floor to form a feed gate spaced rearwardly at a predetermined fixed distance from said front wall, a partition inclined downwardly from said rear wall forwardly adjacent said feed gate to maintain a continuous flow of feed material from said hopper to said feed gate, a feed opening of variable size in said front wall, a barrier in the corner between said floor and front wall and across and inwardly of said feed opening to maintain feed material at a predetermined fixed distance inwardly from said feed opening, said feed gate having a height above said floor adapted to restrict the supply of feed material to a level below the top of said barrier and means for selectively varying the size of said feed opening to afford access through said opening to said material beyond said barrier either by birds of predetermined size while perched on said housing outside said front wall, or alternatively by birds of predetermined smaller size only while perched on said housing outside said front wall.

5. In a bird feeder, the combination specified in claim 4 comprising remote control means for operating said means for varying the size of said feed opening.

6. In a bird feeder, the combination specified in claim 5 comprising a supporting post on which said housing is mounted and a metallic inverted cone element on said post adjacent said housing and forming a barrier to protect said housing against animals climbing said post.

7. In a bird feeder, the combination as specified in claim 4 in which said side walls are made of transparent material to afford inspection of the contents of the feed hopper and said roof is a rigid integral member provided with means for bodily removing the same from said side walls to afford full access to said hopper.

References Cited in the file of this patent

UNITED STATES PATENTS

| | | |
|---|---|---|
| 1,166,100 | White | Dec. 28, 1915 |
| 1,173,823 | McDaniel | Feb. 29, 1916 |
| 1,469,677 | Naylor | Oct. 2, 1923 |
| 2,230,058 | Hornung | Jan. 28, 1941 |
| 2,524,502 | Wilkinson | Oct. 3, 1950 |